United States Patent
Wood

[19]

[11] Patent Number: 6,145,556
[45] Date of Patent: Nov. 14, 2000

[54] ROUTER GUIDE

[76] Inventor: Dale K. Wood, 1072 N. 1000 W., Clinton, Utah 84015

[21] Appl. No.: 09/512,999

[22] Filed: Feb. 25, 2000

[51] Int. Cl.[7] .................. B27C 9/00; B27C 1/00
[52] U.S. Cl. ............. 144/48.6; 33/638; 144/136.95; 144/137; 144/154.5; 409/178
[58] Field of Search ............. 33/638; 144/48.6, 144/134.1, 136.95, 137, 144.1, 154.5, 371, 372; 409/178, 179, 180, 181, 182, 184

[56] References Cited

U.S. PATENT DOCUMENTS

| | | |
|---|---|---|
| 3,782,431 | 1/1974 | Cox . |
| 3,841,368 | 10/1974 | Riher ................... 144/154.5 |
| 4,069,849 | 1/1978 | O'Grady ............... 144/154.5 |
| 4,353,672 | 10/1982 | Smith .................. 144/154.5 |
| 4,770,216 | 9/1988 | Ruscak . |
| 4,880,042 | 11/1989 | Schafferkotter ........ 144/154.5 |
| 5,101,875 | 4/1992 | Eckhold et al. . |
| 5,117,879 | 6/1992 | Payne .................. 144/48.6 |
| 5,203,389 | 4/1993 | Goodwin . |
| 5,240,052 | 8/1993 | Davison . |
| 5,445,198 | 8/1995 | McCurry ............... 144/48.6 |
| 5,533,556 | 7/1996 | Whitney . |
| 5,738,470 | 4/1998 | Sugita . |

*Primary Examiner*—W. Donald Bray
*Attorney, Agent, or Firm*—Thorpe, North & Western

[57] ABSTRACT

A router guide is disclosed which is used to cut grooves of varying widths with a router bit of fixed size. The router guide comprises a base plate, having a guide edge, a depression, and a first hole; and a rotating plate, set into the depression in the base plate, that rotates along a central axis of the first hole, having a second hole located substantially over the first hole, but having a center offset by a distance, wherein the first hole is always larger than the second hole.

10 Claims, 2 Drawing Sheets

ROUTER GUIDE

BACKGROUND OF THE INVENTION

1. The Field of the Invention

This invention relates to router guides used in woodworking for guiding a router in making a groove in a piece of wood. Specifically, it is a router guide which allows the user to cut grooves such as dadoes of different widths with a single router bit.

2. Description of the Related Art

The prior art shows various types of devices used to make routers easier to use and to help the user to make cuts and grooves in wood. Examples of patents related to the present invention are as follows, and each patent is herein incorporated by reference for the supporting teachings:

U.S. Pat. No. 5,738,470, is a guide device for cutting a groove. In the device of this invention, a rectilinear guide member comprises a pair of guide members, where the opening width of an opening defined between the guide members is set to be the same as the diameter of a rotary bit of a router. A dado having a width that is the same as the thickness of a board to be used as a shelf is formed by operating the router with a scrap piece of that board inserted between the guide members to get an accurately cut dado.

U.S. Pat. No. 3,782,431, is a tool for use by a carpenter, used particularly in cabinet construction work, the tool comprising, a guide for a router, wherein the guide is adjustable, the guide being comprised of a pair of parallel guide bars interconnected by transverse extending adjustable bolts for selectively spacing the guide bars apart, and a plurality of transverse extending clamps extending across the guide bars for locating the router position.

U.S. Pat. No. 4,770,216, is a fixture which allows cuts to be made in a board with a hand held router in both a longitudinal and transverse direction of such board. The fixture includes a pair of first members of predetermined length. A pair of second members of shorter predetermined length is secured to a first pair of members such that in an assembled relationship they form a rectangle. At least one T-shaped slot is formed in each of the first pair of members and a notch is formed in at least one of the second pair of members intermediate to the ends thereof.

U.S. Pat. No. 5,203,389, is a multi-purpose woodworking fixture having a structure for facilitating precision-controlled positioning of a woodworking tool, such as a router, about a wood workpiece for cutting wood-joint cuts, wood molding, or geometric designs. The fixture facilitates making a variety of the common wood-joints including dovetail joints, box joints, dado joints, dovetail-dado joint, rabbet joints, combination rabbet and dado joints, mortise and tenon joints, mortise and mortise joints, biscuit joints, lap joints, cross lap joints, end lap joints, dowel joints, spline joints, tongue and groove joints and stile and rail joints. The fixture features a router carriage, a detachable calibrated router positioning mechanical attachment for positioning the router in the X-direction and Y-directions and which complements the router's adjustment in the Z-direction. The fixture enhances the router's capabilities for controllably working on the workpiece, either in a freehand manner or by using, the calibrated router positioning mechanical attachment, either manually or with an optional motorized means.

U.S. Pat. No. 5,101,875, is a router base and combination router and base for use as a guide in making a dado, rabbet groove, or similar cuts, which has a plurality of peripheral edge segments spaced different distances from the center line of the router bit. The base provides for making one or more cuts of varying distances from a conventional fence without adjusting the fence.

U.S. Pat. No. 5,533,556, is a router guide comprising, a channeled track with a fixed fence attached at a top surface on a first end and a moveable fence slidably attached between the first end and the second end. The track affixes to one side of the workpiece and a router attached to a circular disk is manually slid between the fences to cut slots in the workpiece. The fences are rotatable to a plurality of angles to the track. A pair of router stops may be attached to the fences to limit the sliding motion of the router.

U.S. Pat. No. 5,240,052, is a precision router guide for guiding a router in the formation of grooves, slots, steps or other cutaway sections of various widths in a work piece. The precision router guide includes a rectilinear guide member with an integral clamping assembly for securing the guide member to a work piece, and an adjustable template assembly adapted to be slidingly coupled to the guide member. The adjustable template assembly is configured to receive a router base, and provides for the router bit to extend through an opening into engagement with the work piece. The adjustable template assembly also includes two adjustable guide elements and one fixed and one adjustable stop designed to allow adjustable movement between the router base and the template assembly in a direction perpendicular to the guide member, the amount of such movement being determined by the desired width of the cut. Adjustable pointers are provided on the template assembly to enable the groove, slot, step or other cutaway section to be precisely located on the work piece.

The foregoing patents reflect the state of the art of which the applicant is aware and are tendered with a view toward discharging applicant's acknowledged duty of candor in disclosing information that may be pertinent in the examination of the application. It is respectfully stipulated, however, that none of these patents teach or render obvious, singly or when considered in combination, applicant's claimed invention.

PROBLEMS WITH THE PRIOR ART

Routers are woodworking tools used to make grooves along the length or width of a material. Movable handheld routers are capable of producing precise edges and decorative designs as well as grooves such as dadoes, rabbets, and other similar groove cuts. These powered routers are becoming increasingly popular and common among both professional and hobbyist woodworkers.

In using a router, the woodworker typically clamps a straightedge to the material being cut and secures the material to a work surface. This surface usually has a second straight edge, or "fence" which is used to help the woodworker to cut in a straight line. The groove to be cut is made by guiding the router along this fence.

Routers have several characteristics which make their use difficult, time consuming, and potentially wasteful of material. First, variances in the density of the material being cut or imperfections such as warping in the material make cutting a straight line with a router very difficult. Users often spend much time making customized guides or patterns for specific projects or operations. Further, often the groove being cut needs to be wider than the width of the router bit. One method for making grooves wider in the prior art was to change router bit sizes when needed. This process has historically been time-consuming and clumsy. Another method for increasing the width of grooves was to repeatedly move and reclamp either the fence or the material being cut with each pass made with the router until the groove had reached the desired width. By introducing this step of moving or repositioning the fence or the material being cut, however, the effort and time needed to complete a project were increased. In addition, the potential for inaccuracy was greatly increased by the repositioning of the pieces. Each reposition of the components required remeasuring to assure that the new position would allow the proper cut to be made, and each reposition could introduce either the chance that another cut would be needed to make the requisite width, or the danger that too much will be cut away, leaving a groove which is unusably wide. As a result, time and potentially material are wasted by using the methods known in the prior art.

There is thus a need for a router guide which effectively guides the user in cutting alone straight lines with a hand router, while allowing the user to cut grooves of different widths with a single router bit.

SUMMARY OF THE PREFERRED EMBODIMENT

It is a feature of the invention to provide a router guide, used to cut grooves of varying widths with a router bit of fixed size. In particular, there is a router guide which performs better than those disclosed in the prior art.

A further feature of the invention is to provide a router guide, comprising a base plate, having a guide edge, a depression, and a first hole; and a rotating plate, set into the depression in the base plate, which rotates around a first hole central axis of the first hole, having a second hole located substantially over the first hole, but having a second hole central axis that is offset by a distance.

It is an additional feature of the invention to provide a router guide, wherein the first hole is larger than the second hole, thus allowing the router bit to rotate around a first hole central axis of the first hole.

A further feature of the invention is to provide a router guide wherein the base plate has a guide edge which is used to align the guide with a guide fence. An additional feature of the invention is to provide a router guide wherein the rotating plate is circular.

The invention resides not in any one of these features per se, but rather in the particular combination of all of them herein disclosed and claimed, and it is distinguished from the prior art in this particular combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter which would form the subject matter of the claims appended hereto. Those who are skilled in the art will appreciate that the conception, upon which this disclosure is based, may readily be utilized as a basis for the designing of other structures, methods, and systems for carrying out the several purposes of the present invention. It is important, therefore, that the claims are regarded as including such equivalent constructions insofar as they do not depart from the spirit and scope of the present invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, neither is it intended to be limiting as to the scope of the invention in any way.

Other features of the present invention will become clearer from the following detailed description of the invention, taken with the accompanying drawings and claims, or may be learned by the practice of the invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. Like numbering used on different drawings represents like elements.

Charter by the U.S. Constitution

This disclosure of the invention is submitted in furtherance of the constitutional purposes of the United States Patent Laws "to promote the progress of science and useful arts," as stated in Article 1, Section 8 of the United States Constitution.

DETAILED DESCRIPTION OF THE PREFERRED EMBODIMENT

Figure 1:
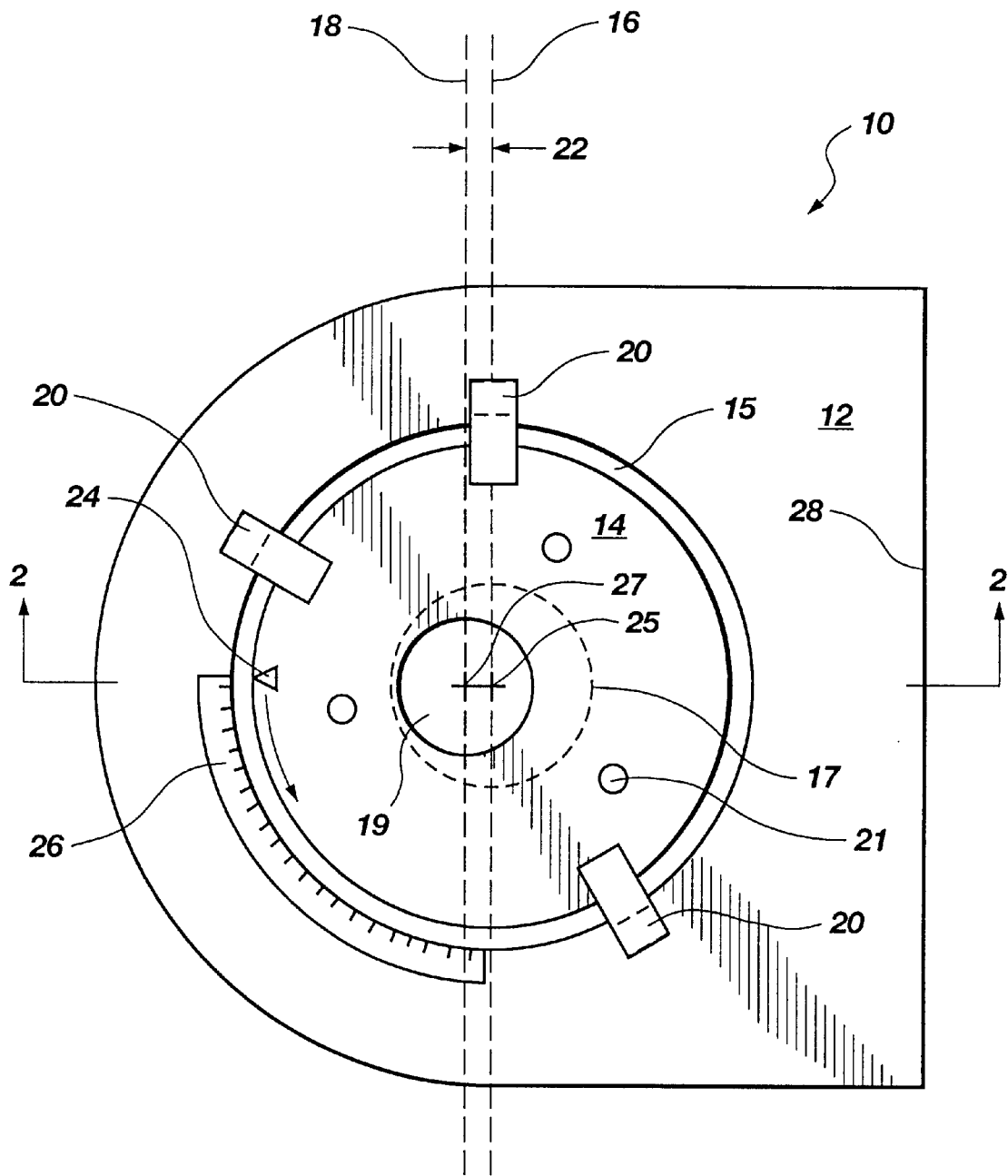
FIG. 1 is a top view of a router tool.
Figure 2:
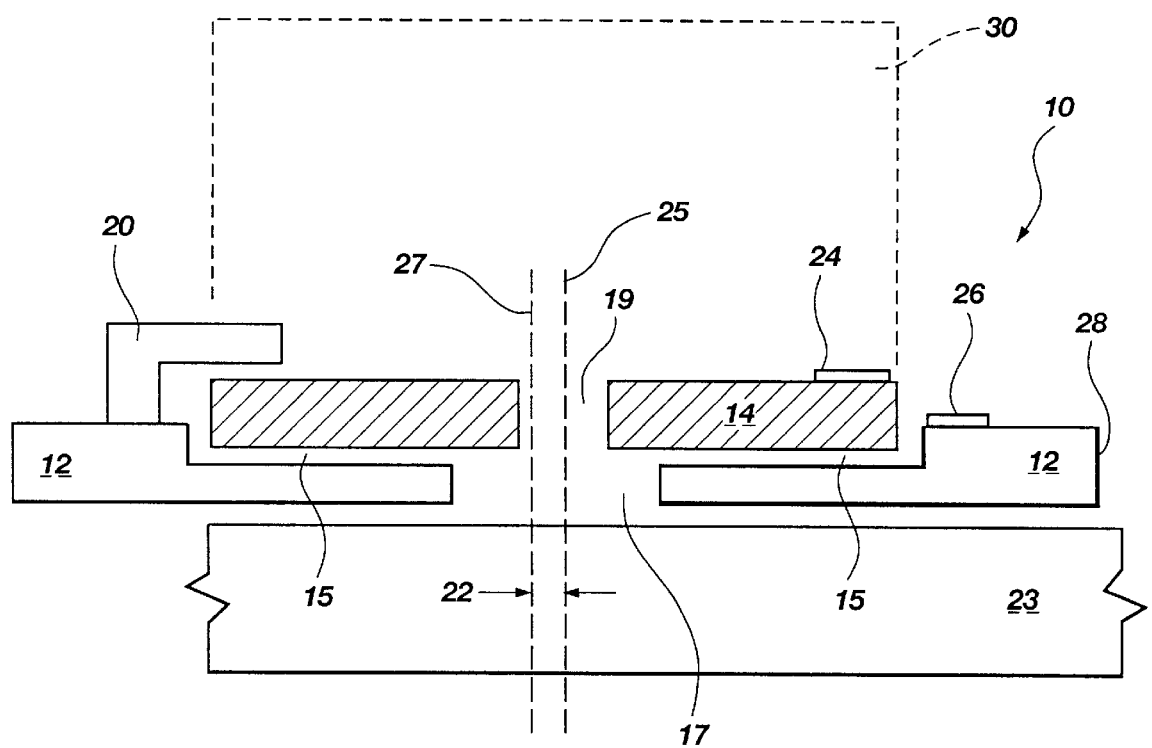
FIG. 2 is a cutaway view of the router tool shown in FIG. 1 along the line indicated in FIG. 1.

Referring to FIG. 1 and FIG. 2, there is a top view and a cutaway view of the preferred router tool 10. Specifically, there is a base plate 12, a rotating plate 14, and a retainer 20. Rotating plate 14 rests rotatably in depression 15 in base plate 12. Base 12 further comprises a guide edge 28, which is pressed against a guide fence (not shown) to assure that the router traverses along straight lines in successive cuts in the same region. A router 30 will be mounted to the rotating plate 14 by attachment points 21, such that the router bit (not shown) will fit through first and second holes 17 and 19. Center line 16 runs through the first hole central axis 25 of first hole 17 in base 12. Center line 18 runs through the second hole central axis 27 of second hole 19 in rotating plate 14. Base 12 slidably lays on board 23 for cutting a groove (not shown)along center line 18.

Uniquely, center line 18 and hole 19 are not centrally aligned with base 12. This allows the router bit to rotate about the first hole central axis 25 of first hole 17 as rotating plate 14 is rotated. The distance of the movement is the distance between center line 16 and center line 18, which is distance 22. This distance may be calibrated to correspond with measurements shown on measurement scale 26. When indicator arrow 24 is at the position of FIG. 2, the center line 18 is at its furthest position distal to the guide fence from center line 16. By rotating rotating plate 14 by 90 degrees, center line 18 becomes coextensive with center line 16.

In operation, a first cut on board 21 is made when center lines 16 and 18 are coextensive. Thus, a ½" router bit will cut an exact ½" first groove. An edge of a second board meant to fit within the groove may be abutted to the first groove, or measurements may be noted to determine how much wider the groove needs to be. The rotating plate 14 is then rotated either clockwise or counterclockwise, dependent on which direction the user desires to displace the router bit from the center of hole 17, thus displacing center line 18 from center line 16 sufficiently to equate distance 22 to the increase in width needed for the groove.

Remarks About the Preferred Embodiment

One of ordinary skill in the art of designing woodworking equipment will realize many advantages from using the preferred embodiment. First, a skilled artisan would appreciate the use of the invention in cutting grooves such as dadoes, rabbets, and other grooves. Note that the first hole central axis (25) and the second hole central axis (27) are offset from each other, which positions the two holes eccentrically to each other. A skilled artisan would appreciate this eccentricity of second hole 19 on rotating plate 14 from first hole 17 on base plate 12. This eccentricity allows the user to use a router to make grooves of varying widths by making repeated cuts with a single router bit.

A skilled artisan would further value the fact that since second hole 19 is always smaller than first hole 17 in the invention, rotation of second hole 19 around the first hole central axis of first hole 17 allows the position of the router bit to change relative to the guide fence.

Further, a skilled artisan would recognize that use of an eccentric circular guide allows for very smooth, gradual adjustment of the distance 22 in order to accommodate any needed change in width of the groove within the range of distances possible for distance 22.

Similarly, one skilled in the art would recognize the benefits of the retainers 20 for holding the rotating plate 14 in place after adjustments have been made to change the distance between the center lines of the first and second holes, 17 and 19. These retainers hold the rotating plate in a fixed position, thus preventing slippage and unintended changes in the width of the groove being cut by the router.

A skilled artisan would similarly appreciate that the design of the guide 10 allows for additional cuts to be made on either side of the original groove, thus being more proximal or more distal to the guide fence. By turning rotating plate 14 clockwise up to 90 degrees, the distal side of the original groove may be widened with additional cuts. Similarly, by turning rotating plate 14 counterclockwise up to 90 degrees, the proximal side of the original groove may be widened with additional cuts.

A skilled artisan would also recognize that the device is equally usable to right- and left-handed users by rotating it to abut the guide fence either on the left side of the workpiece.

Variations of the Invention

A skilled artisan would consider it an obvious design change to use different sizes and dimensions in constructing the apparatus in order to accommodate different types or sizes of routers, router tables, guide fences, and router bits. Further, the dimensions of the first and second holes 17 and 19 in both the base and rotating plates 12 and 14, respectively, may be varied in size and relationship in order to accommodate different sizes and shapes of router bits and thus the desired grooves. In all designs of the invention, however, second hole 19 will have to some extent a diameter smaller than that of first hole 17.

Further, a skilled artisan would consider changes to the size and shape of base plate 12 to accommodate the needs or desires of the user to be obvious. These modifications to base plate 12 could include changing its shape to be square, rectangular, etc. Further, the corners of base plate 12 could be rounded. Further, base plate 12 could be constructed of any number of materials, including plastic, metal, and wood, without departing from the scope of the invention. Base plate 12 could likewise be mounted on bearings or other such devices to facilitate motion along the guide fence. Guide edge 28 could similarly use bearings to facilitate sliding along the guide fence.

Rotating plate 14 could also be changed in size and shape to any form rotatable in depression 15. Rotating plate 14 could be made large enough, for example, to allow cutting of grooves wider than the router bit as well as entirely separate grooves without unclamping or moving the workpiece or guide fence. Rotating plate 14 could also be mounted on bearings or other similar devices to facilitate its rotation in depression 15 without departing from the spirit of the invention.

A skilled artisan would further consider it obvious to increase or decrease the size of rotating plate 14 in relation to base plate 12. Such an artisan would similarly consider it obvious to increase or decrease the sizes of first and second holes 17 and 19 relative to base and rotating plates 12 and 14.

It would in like manner not depart from the scope of the invention to increase the size of first hole 17 while decreasing the size of second hole 19 in order to permit a very wide range of grooves of different widths to be cut with a single router bit.

Additionally, one skilled in the art would recognize that measurement scale 26 could be extended to cover ¼, ½, or all of the perimeter of rotating plate 14 on base plate 12 to allow freedom of adjustment with indicator arrow 24, and to allow use of the router guide 10 with a guide fence on either the right or the left of the material to be cut to accommodate either right- or left-handed users. Similarly, it would be considered an obvious design change to mark the measurement scale in centimeters, inches, degrees, or other units corresponding either to the degree of the angle between the indicator arrow 24 and center line 16, or to the amount of change of size of the groove which would be caused by making an additional cut with the indicator arrow 24 at a given placement.

Similarly, the number, type, and position of retainers 20 could be varied to provide either more or less support of the rotating plate 14 or otherwise facilitate the use of guide 10 without departing from the scope of the invention.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States patent is:

1. A router guide (10), used to cut grooves of varying widths with a router bit of fixed size, comprising:
   a) a base plate (12), having:
      1) a guide edge (28);
      2) a depression (15); and
      3) a first hole (17), located in the depression, having a first hole central axis (25); and
   b) a rotating plate (14), set into the depression (15) and that rotates around the first hole central axis (25), having a second hole (19) located substantially over the first hole, but having a second hole central axis (27) that is offset by a distance (22).

2. The guide of claim 1, wherein the first hole (17) is larger than the second hole (19).

3. The guide of claim 1, wherein the base plate (12) is square.

4. The guide of claim 1, wherein the rotating plate (14) is circular.

5. The guide of claim 1, wherein the rotating plate (14) rotates on bearings mounted in the depression (15) of the base plate (12).

6. A router guide 10, used to cut grooves of varying widths with a router bit of fixed size, comprising:
   a) a base plate (12) having a top surface;
   b) a guide edge (28), forming one side of the base plate (12);
   c) a depression (15), located within the top surface;
   d) a first hole (17), located in the depression;
   e) a rotating plate (14), positioned in the depression (15); and
   f) a second hole (19), located in the rotating plate (14) and positioned over the first hole (17), wherein the second hole is located eccentrically from the first hole.

7. The guide of claim 6, wherein the first hole (17) is larger than the second hole (19).

8. The guide of claim 6, wherein the base plate (12) is square.

9. The guide of claim 6, wherein the rotating plate (14) is circular.

10. The guide of claim 6, wherein the rotating plate (14) rotates on bearings mounted in the depression (15) of the base plate (12).

* * * * *